United States Patent
Chen

(10) Patent No.: US 10,075,871 B2
(45) Date of Patent: Sep. 11, 2018

(54) BSR REPORTING METHOD, EVOLVED NODE B, UE AND COMPUTER STORAGE MEDIUM

(71) Applicant: ZTE Corporation, Shenzhen (CN)

(72) Inventor: Zhongming Chen, Shenzhen (CN)

(73) Assignee: ZTE Corporation, Guangdong (CN)

( * ) Notice: Subject to any disclaimer, the term of this patent is extended or adjusted under 35 U.S.C. 154(b) by 199 days.

(21) Appl. No.: 15/035,604

(22) PCT Filed: May 20, 2014

(86) PCT No.: PCT/CN2014/077924
§ 371 (c)(1),
(2) Date: May 10, 2016

(87) PCT Pub. No.: WO2014/183688
PCT Pub. Date: Nov. 20, 2014

(65) Prior Publication Data
US 2016/0286429 A1    Sep. 29, 2016

(30) Foreign Application Priority Data

Nov. 11, 2013    (CN) .......................... 2013 1 0557960

(51) Int. Cl.
*H04W 28/02*        (2009.01)
*H04W 72/12*        (2009.01)
*H04W 28/08*        (2009.01)

(52) U.S. Cl.
CPC ....... *H04W 28/0278* (2013.01); *H04W 28/08* (2013.01); *H04W 72/1284* (2013.01); *H04W 72/1289* (2013.01)

(58) Field of Classification Search
CPC ............. H04W 28/0278; H04W 72/10; H04W 76/025; H04W 24/04; H04W 72/1284;
(Continued)

(56) References Cited

U.S. PATENT DOCUMENTS

| 8,543,054 B2 | 9/2013 | Oestergaard |
| 2010/0173637 A1 | 7/2010 | Damnjanovic |

(Continued)

FOREIGN PATENT DOCUMENTS

| CN | 102065552 | 5/2011 |
| CN | 102111751 A | 6/2011 |

(Continued)

OTHER PUBLICATIONS

International Search Report in international application No. PCT/CN2014/077924, dated Sep. 3, 2014.
(Continued)

*Primary Examiner* — Jung-Jen Liu
(74) *Attorney, Agent, or Firm* — Oppedahl Patent Law Firm LLC

(57) ABSTRACT

A method for sending a Buffer Status Report (BSR) is provided, which includes that: an Evolved Node B (eNB) sends an allocation rule for buffer data of a radio bearer which are to be allocated among eNBs to User Equipment (UE), the allocation rule including allocation proportion information or including allocation proportion information and an applicable condition of the allocation proportion information; and the eNB receives a BSR from the UE, the BSR being determined by the UE according to the allocation rule. Correspondingly, the embodiments of the present disclosure further provide an eNB, UE and a computer storage medium.

13 Claims, 4 Drawing Sheets

(58) Field of Classification Search
CPC ... H04W 28/12; H04W 72/04; H04W 72/044; H04L 2001/0097; H04L 1/1874; H04L 47/14; H04L 47/10; H04L 47/263; H04L 47/30; H04L 47/35
See application file for complete search history.

(56) References Cited

U.S. PATENT DOCUMENTS

| | | | |
|---|---|---|---|
| 2011/0261747 A1* | 10/2011 | Wang | H04B 7/155 370/315 |
| 2011/0269393 A1* | 11/2011 | Ostergaard | H04B 7/155 455/7 |
| 2012/0039175 A1 | 2/2012 | Sridhar | |
| 2012/0071185 A1* | 3/2012 | Dayal | H04W 72/1215 455/509 |
| 2013/0016615 A1 | 1/2013 | Shi | |
| 2014/0126399 A1* | 5/2014 | Damnjanovic | H04W 72/1252 370/252 |
| 2015/0358838 A1* | 12/2015 | Wei | H04W 24/04 370/228 |

FOREIGN PATENT DOCUMENTS

| | | |
|---|---|---|
| CN | 102202343 A | 9/2011 |
| CN | 102273124 A | 12/2011 |
| CN | 102291200 A | 12/2011 |
| CN | 102291772 A | 12/2011 |
| CN | 102577558 A | 7/2012 |
| CN | 102742345 A | 10/2012 |
| CN | 103141145 A | 6/2013 |
| CN | 103313396 A | 9/2013 |
| WO | 2011139220 A1 | 11/2011 |
| WO | 2011160292 A1 | 12/2011 |

OTHER PUBLICATIONS

English Translation of the Written Opinion of the International Search Authority in international application No. PCT/CN2014/077924, dated Sep. 3, 2014.

Huawei et al: "BSR for small cell enhancement",3GPP Draft; R2-133883, 3rd Generation Partnership Project (3GPP), Mobile Competence Centre ; 650, Route Des Lucioles ; F-06921 Sophia-Antipolis Cedex ; France vol. RAN WG2, no. San Francisco, USA; Nov. 11, 2013-Nov. 15, 2013 Nov. 1, 2013 (Nov. 1, 2013 ), XP050753015, Retrieved from the Internet:URL:http://www.3gpp.org/ftp/tsg_ran/WG2_RL2/TSGR2_84/Docs/ [retrieved on Nov. 1, 2013 ].

Panasonic: "BSR Reporting Options for Dual Connectivity",3GPP Draft ; BSR Reporting in Dual Connectivity, 3rd Generation Partnership Project (3GPP), Mobile Competence Centre ; 650, Route Des Lucioles ; F-06921 Sophia-Antipolis Cedex ; France vol. RAN WG2, no. San Francisco, USA; Nov. 11, 2013-Nov. 15, 2013 Nov. 1, 2013 (Nov. 1, 2013 ), XP050753041, Retrieved from the Internet: URL:http://www.3gpp.org/ftp/tsg_ran/WG2_RL2/TSGR2_84/Docs/ [retrieved on Nov. 1, 2013 ].

Supplementary European Search Report in European application No. 14797664.1, dated Oct. 18, 2016.

* cited by examiner

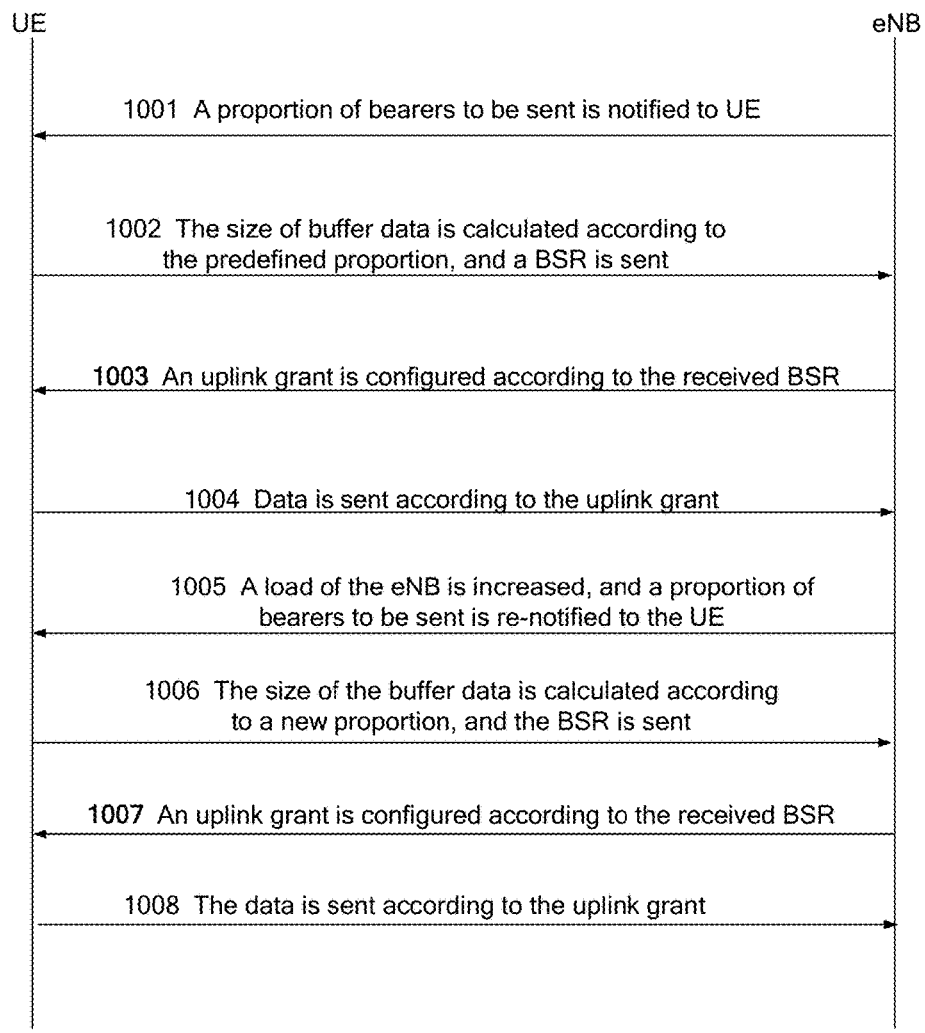

BSR REPORTING METHOD, EVOLVED NODE B, UE AND COMPUTER STORAGE MEDIUM

TECHNICAL FIELD

The disclosure relates to the field of communications, and in particular to a method, an Evolved Node B (eNB), User Equipment (UE) and a computer storage medium for sending a Buffer Status Report (BSR).

BACKGROUND

In a Long Term Evolution (LTE) system, a protocol architecture of a user plane on the side of a User Equipment (UE) or a terminal according to a related technology is shown in FIG. 1, and is divided into the following protocol layers from bottom to top: a Physical (PHY) layer, a Media Access Control (MAC) layer, a Radio Link Control (RLC) layer and a Packet Data Convergence Protocol (PDCP) layer, wherein the PHY layer transmits information to the MAC layer or a higher layer mainly through a transmission channel; the MAC layer transmits data and allocates radio resources mainly through a logical channel, and realizes functions including Hybrid Automatic Repeat Request (HARQ), Scheduling (SCH), priority processing, multiplexing (MUX) and demultiplexing and the like; the RLC layer mainly provides segmentation and retransmission service for user data and control data; and the PDCP layer mainly implements transmission of user data for Radio Resource Control (RRC) or an upper layer of the user level. When a terminal establishes a Data Radio Bearer (DRB), an eNB may allocate a Logical Channel Group (LCG) to which the DRB belongs, and there are totally four LCGs 0, 1, 2 and 3 at present. A terminal in a connected state may send a BSR containing the size of buffer data prepared on an LCG to an eNB if there is no uplink resource or grant when needing to send uplink data, the eNB then may configure a corresponding uplink grant for the terminal according to the size of the buffer data after receiving the BSR, and the terminal may send the uplink data after receiving the uplink grant. The buffer data includes buffer data, in an RLC layer and a PDCP layer, of a corresponding DRB on the LCG.

After introduction of a Carrier Aggregation (CA) technology, UE may simultaneously communicate with a source eNB through multiple Component Carriers (CCs) (such as CC1 and CC2) after entering a connected state, and a Primary Cell (Pcell) and a Secondary Cell (Scell) are introduced. Due to increase of a data volume, the number of Scells may be increased, for example, to 4, and a scenario may also be broadened, for example, to support an uplink Remote Radio Head (RRH) and a repeater. Since multiple serving cells are located in the same eNB, a protocol architecture of a user plane does not change, and a BSR sending manner changes nothing else only with reported buffer data increased for increase of the data volume only.

Due to lack of spectrum resources and sharp increase of heavy-traffic services of mobile users, a requirement on adoption of a high frequency point such as 3.5 GHz for hotspot coverage becomes increasingly obvious, and adoption of a low-power node becomes a new application scenario, and aims to improve user throughput and enhance mobility. However, since a signal of a high frequency point is greatly attenuated and a small cell has smaller coverage and does not share a site with an existing cell, many corporations and operating companies tend to seek for new enhancement solutions, one of which is dual connectivity. A terminal under dual connectivity may simultaneously keep data connections with larger than two network nodes, but a control plane connection only includes a connection with one cell such as a macro cell. A difference with CA is that multiple serving nodes of a terminal are multiple eNBs, and time delays among the eNBs are not ignorable. Therefore, FIG. 2 is one of user-plane protocol architectures which are well known at present, a DRB may be segmented among the multiple eNBs, that is, data of the DRB may be sent through the multiple eNBs, macro eNBs are called MeNBs and small-cell eNBs are called SeNBs. From the figure, it can be seen that a PDCP layer only exists on one eNB, but RLC layers exist on each eNB respectively, that is, a PDCP layer may be associated with multiple RLC layers, wherein a PDCP layer of an MeNB interacts with an RLC layer of an SeNB through an Xn interface. There is yet no method disclosed for reporting the size of buffer data of a BSR.

SUMMARY

In order to solve the technical problem, an embodiment of the present disclosure provides a method for sending a BSR, which may include that:

an eNB sends an allocation rule for buffer data of a radio bearer which are to be allocated among eNBs to UE, the allocation rule including allocation proportion information or including allocation proportion information and an applicable condition of the allocation proportion information; and the eNB receives a BSR from the UE, the BSR being determined by the UE according to the allocation rule.

Preferably, the allocation rule may be determined according to a load of the eNB or signal quality of a cell corresponding to the eNB.

Preferably, when the load of the eNB is changed or the signal quality of the cell corresponding to the eNB is reduced, the eNB resends the allocation rule.

Preferably, the allocation proportion information may include at least one of followings: the allocation proportion information is a proportion relationship of specific bearers among the eNBs; and the allocation proportion information is a proportion relationship of specific bearers belonging to LCGs among the eNBs, wherein the specific bearers may be all or a part of DRBs or signalling radio bearers.

Preferably, the allocation proportion information may be an allocation proportion of buffer data in a PDCP layer which are to be allocated among the eNBs.

Preferably, the allocation proportion information and the applicable condition of the allocation proportion information may be that: when the size of the buffer data is not larger than a predetermined value, the buffer data is sent from a specified eNB, or, the buffer data is specified to be sent from an eNB where a large proportion of data of the radio bearer according to a predetermined allocation proportion is to be sent.

An embodiment of the present disclosure provides an eNB, which may include:

a sending module, configured to send an allocation rule for buffer data of a radio bearer which are to be allocated among eNBs to UE, the allocation rule including allocation proportion information or including allocation proportion information and an applicable condition of the allocation proportion information; and a receiving module, configured to receive a BSR from tie UE, the BSR being determined by the UE according to the allocation rule.

Preferably, the allocation rule may be determined according to a load of the eNB or signal quality of a cell corresponding to the eNB.

Preferably, the allocation proportion information may include at least one of followings: the allocation proportion information is a proportion relationship of specific bearers among the eNBs; and the allocation proportion information is a proportion relationship of specific bearers belonging to LCGs among the eNBs, wherein the specific bearers may be all or a part of DRBs or signalling radio bearers.

Preferably, the allocation proportion information may be an allocation proportion of buffer data in a PDCP layer which are to be allocated among the eNBs.

Preferably, the allocation proportion information and the applicable condition of the allocation proportion information may be that: when the size of the buffer data is not larger than a predetermined value, the buffer data is sent from a specified eNB, or, the buffer data is specified to be sent from an eNB where a are proportion of data of the radio bearer according to a predetermined allocation proportion is to be sent.

An embodiment of the present disclosure further provides a method for sending a BSR, which may include that:

UE receives from an eNB an allocation rule for buffer data of a radio bearer which are to be allocated among eNBs, the allocation rule including allocation proportion information or including allocation proportion information and an applicable condition of the allocation proportion information; and the UE sends a BSR according to the allocation rule, the BSR being determined by the UE according to the allocation rule.

Preferably, the allocation rule may be determined according to a load of the eNB or signal quality of a cell corresponding to the eNB.

Preferably, the allocation proportion information may include at least one of followings: the allocation proportion information is a proportion relationship of specific bearers among the eNBs; and the allocation proportion information is a proportion relationship of specific bearers belonging to LCGs among the eNBs, wherein the specific bearers may be all or a part of DRBs or signalling radio bearers.

Preferably, the allocation proportion information may be an allocation proportion of buffer data in a PDCP layer which are to be allocated among the eNBs.

Preferably, the allocation proportion information and the applicable condition of the allocation proportion information may be that: when the size of the buffer data is not larger than a predetermined value, the buffer data is sent from a specified eNB, or, the buffer data is specified to be sent from an eNB where a large proportion of data of the radio bearer according to a predetermined allocation proportion is to be sent.

An embodiment of the present disclosure further provides UE, which may include:

a receiving module, configured to receive from an eNB an allocation rule for buffer data of a radio bearer which are to be allocated among eNBs, the allocation rule including allocation proportion information or including allocation proportion information and an applicable condition of the allocation proportion information; and a sending module, configured to send a BSR reported by the UE to the eNB, the BSR being determined by the UE according to the allocation rule.

Preferably, the allocation rule may be determined according to a load of the eNB or signal quality of a cell corresponding to the eNB.

Preferably, when the load of the eNB is changed or the signal quality of the cell corresponding to the eNB is reduced, the eNB resends the allocation rule.

Preferably, the allocation proportion information may include at least one of followings: the allocation proportion information is a proportion relationship of specific bearers among the eNBs; and the allocation proportion information is a proportion relationship of specific bearers belonging to LCGs among the eNBs, wherein the specific bearers may be all or a part of DRBs or signalling radio bearers.

An embodiment of the present disclosure further provides a computer storage medium, in which computer-executable instructions may be stored, the computer-executable instructions being configured to execute the abovementioned methods.

Compared with a conventional art, the present disclosure has the advantages that each eNB may acquire a relatively accurate size of buffer data required to be sent by the UE in a cell belonging to the eNB, and coordination for data transmission among the eNBs is not required, so that subsequent scheduling of the eNBs is further simplified.

BRIEF DESCRIPTION OF THE DRAWINGS

FIG. 10 is a flowchart of application embodiment 2 of the present disclosure.

DETAILED DESCRIPTION

In order to make the purpose, technical solutions and advantages of the present disclosure clearer, the technical solutions of the present disclosure will be further described below with reference to the drawings and specific embodiments in detail to make those skilled in the art better understand and implement the present disclosure, but the listed embodiments are not intended to limit the present disclosure. It is to be noted that the embodiments in the present disclosure and characteristics in the embodiments may be combined under the condition of no conflicts.

In the following application examples, eNB 1 is an MeNB with a cell, i.e. cell 1, and eNB 2 is an SeNB with two cells, i.e. cell 3 and cell 4 respectively. Descriptions are made for DRBs in the following embodiments, and are also effective for signalling radio bearers. Descriptions about signalling radio bearers will not be repeated. Radio bearer buffer data in claims includes a DRB and a signalling radio bearer.

UE respectively sends a BSR of each eNB to the each eNB, containing information about a size of buffer data of a corresponding DRB of an LCG on the eNB, wherein the size of the buffer data of each eNB includes two parts, one part being the size of buffer data of an RLC layer on the eNB and the other part being a part of size predetermined to be sent by the eNB in the size of buffer data in a PDCP layer, and is calculated according to a predefined allocation rule such as a proportion.

Figure 1:
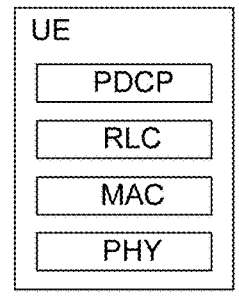
FIG. 1 is a diagram of a user-plane protocol architecture according to the related technology.
Figure 2:
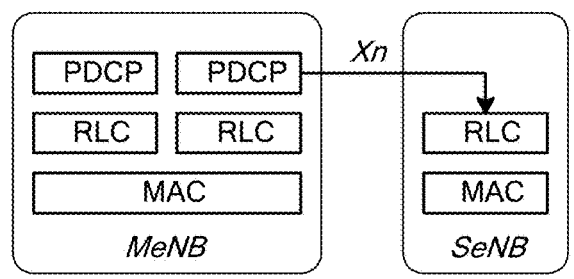
FIG. 2 is a diagram of a user-plane protocol architecture after introduction of a small cell according to the related technology.
Figure 3:
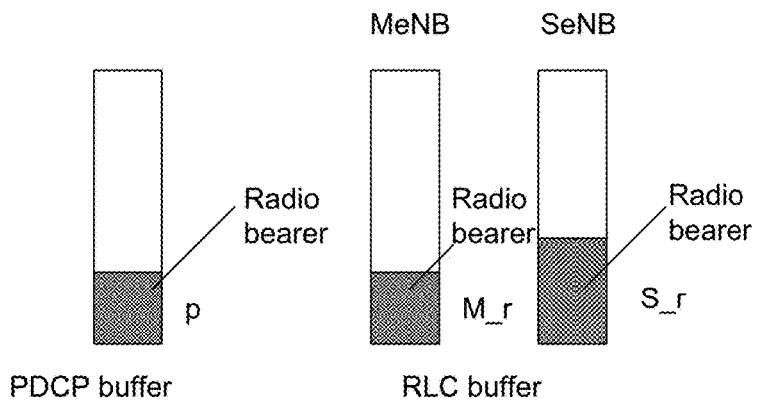
FIG. 3 is a diagram of data buffer of a radio bearer according to an embodiment of the present disclosure.

As shown in FIG. 3, if a proportion of DRBs sent on an MeNB to DRBs sent on an SeNB is x:y, then the size of buffer data in a BSR sent on the MeNB is $p \times (x/(x+y))+M\_r$, wherein $p \times (x/(x+y))$ is the size of data predetermined to be sent through the MeNB in buffer data of a PDCP layer, and $M\_r$ is the size of buffer data in an RLC layer on the MeNB; and the size of buffer data in a BSR sent on the SeNB is $p \times (y/(x+y))+S\_r$, wherein $p \times (y/(x+y))$ is the size of data predetermined to be sent through the SeNB in buffer data of a PDCP layer, and $S\_r$ is the size of buffer data in an RLC layer on the SeNB.

Figure 4:
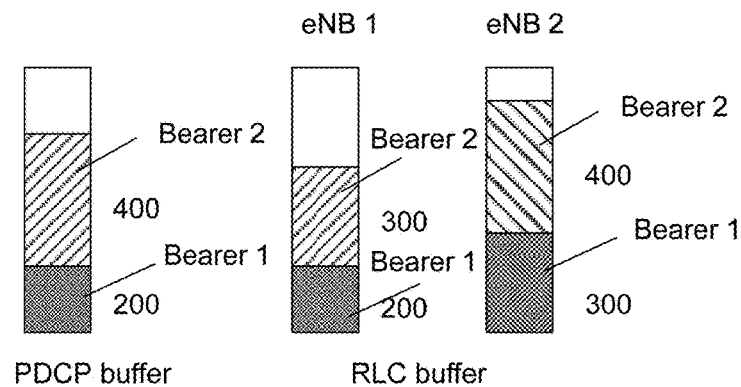
FIG. 4 is a diagram of data buffer of a radio bearer according to an embodiment.

DRB 1 corresponds to bearer 1 in FIG. 4, DRB 2 corresponds to bearer 2 in FIG. 4, the size of buffer data of DRB 1 in a PDCP layer is 200, the size of buffer data of DRB 1 in an RLC layer on eNB 1 is 200 and the size of buffer data of DRB 1 in an RLC layer on eNB 2 is 300, while the size of buffer data of DRB 2 in a PDCP layer is 400, the size of buffer data of DRB 2 in an RLC layer on eNB 1 is 300 and the size of buffer data of DRB 2 in an RLC layer on eNB 2 is 400. To facilitate understanding, descriptions will be made with examples in the following embodiments and application implementation.

Embodiment 1

Figure 5:
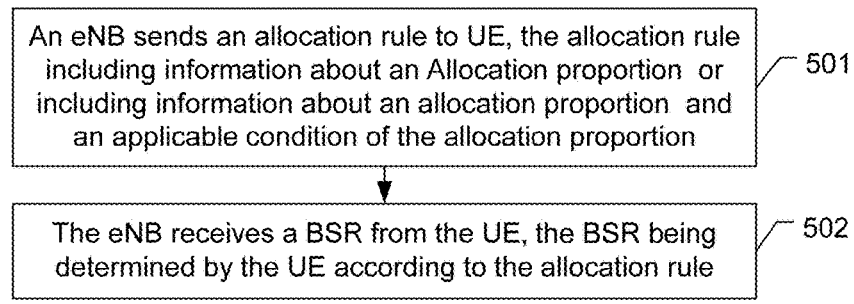
FIG. 5 is a diagram of an embodiment from the aspect of an eNB according to the present disclosure.

The embodiment of the present disclosure is described below from the aspect of an eNB, and as shown in FIG. 5, the embodiment specifically includes the following steps.

Step 501: an eNB sends an allocation rule to UE, the allocation rule including information about an allocation proportion or including information about an allocation proportion and an applicable condition of the allocation proportion.

Preferably, the allocation rule is determined according to a load of the eNB. When the load of the eNB changes or signal quality of a cell corresponding to the eNB is reduced, the eNB resends the allocation rule.

Preferably, the allocation proportion information includes at least one of the followings: the allocation proportion information is a proportion relationship of specific bearers among eNBs; and the allocation proportion information is a proportion relationship of specific bearers belonging to LCGs among the eNBs, wherein the specific bearers are DRBs or signalling radio bearers.

Preferably, the allocation proportion information is about a proportion for a value of a buffer space in a PDCP layer, and the allocation rule further includes a value of a data buffer space of an RLC layer.

Step 502: the eNB receives a BSR from the UE, the BSR being determined by the UE according to the allocation rule.

Preferably, the allocation proportion information and the applicable condition of the allocation proportion information are that: when the size of the buffer data is not larger than a predetermined value, the buffer data is sent from a specified eNB, or, is specified to be sent from an eNB where a large proportion of data of the radio bearer according to a predetermined allocation proportion is to be sent.

Figure 6:
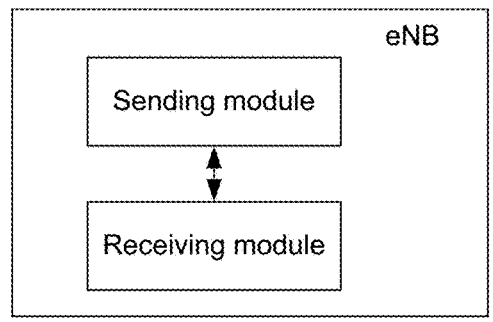
FIG. 6 is a diagram of an eNB according to an embodiment of the present disclosure.

In order to implement the method of the embodiment of the present disclosure, an eNB is further provided, which will be described with reference to FIG. 6.

The eNB includes a sending module and a receiving module, wherein the sending module is configured to send an allocation rule to UE, the allocation rule including allocation proportion information or including allocation proportion information and an applicable condition of the allocation proportion information; and the receiving module is configured to receive a BSR from the UE, the BSR being determined by the UE according to the allocation rule.

The allocation proportion may be a proportion of sizes of DRBs, which are proportionally sent on eNB 1 and eNB 2, of DRB 1 and DRB 2 in application example 1 to application example 3; the allocation proportion may refer to a proportion of a DRB size, which is sent on eNB 1 and eNB 2 according to a corresponding proportion, of DRB 1, DRB 2 also being sent on eNB 1 and eNB 2 according to a corresponding proportion; the allocation proportion information may also refer to, when DRB 1 belongs to LCG0 and DRB 2 belongs to LCG1, a proportion of a DRB, which is sent on eNB 1 and eNB 2 according to a corresponding proportion, on LCG0 and DRB proportion information of a DRB, which is sent on eNB 1 and eNB 2, on LCG1. Of course, the proportion information may also refer to proportion information of a signalling radio bearer.

The allocation rule is determined according to a load of the eNB, and for example, a corresponding bearer proportion is determined to be 3:7 according to the load of the eNB in the abovementioned application example. When the load of the eNB changes or signal quality of a cell corresponding to the eNB is reduced, the eNB resends the allocation rule. For example, in Step 4 in application example 1, when a load of eNB 1 is increased at a certain moment, the eNB determines to modify a DRB sending proportion and notifies the UE to send data of DRB 1 and data of DRB 2 on eNB 1 and eNB 2 according to a proportion of 2:8.

Preferably, the allocation proportion information includes at least one of the followings: the allocation proportion information is a proportion relationship of specific bearers among eNBs; and the allocation proportion information is a proportion relationship of specific bearers belonging to LCGs among the eNBs, wherein the specific bearers are DRBs or signalling radio bearers. The allocation proportion information is about an allocation proportion of buffer data in a PDCP layer which are to be allocated among the eNBs, and the allocation rule further includes the size of buffer data in an RLC layer.

Preferably, in application example 1, the allocation proportion information and the applicable condition of the allocation proportion information are that: when the size of the buffer data is not larger than a predetermined value, the buffer data is sent from a specified eNB, or, is specified to be sent from an eNB where a large proportion of data of the radio bearer according to a predetermined allocation proportion is to be sent. For example, in application example 1, a DRB a size of buffer data smaller than or equal to 200 is specified to be sent from eNB 2, or is specified to be sent from an eNB where a large proportion of data of the radio bearer according to a predetermined allocation proportion is to be sent.

The allocation proportion information is a proportion of the sizes of the buffer data allocated in the PDCP layer, and the allocation rule further includes the size of buffer data in an RLC layer. In application example 1, the size of the buffer data in the PDCP layer is 600, and a proportion of the sizes of the buffer data is 3:7.

Embodiment 2

Figure 7:
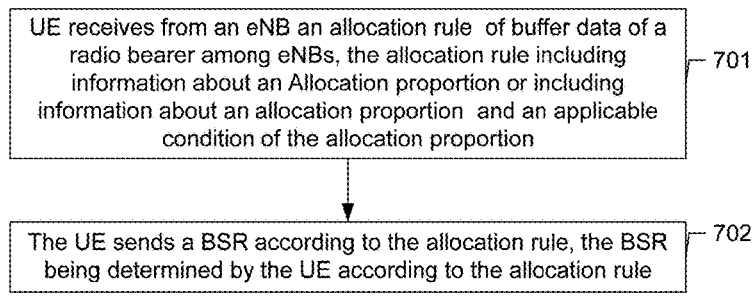
FIG. 7 is a diagram of an embodiment from the aspect of a terminal according to the present disclosure.

The embodiment of the present disclosure is described from UE side, and as shown in FIG. 7, the embodiment specifically includes the following steps.

Step 701: UE receives from an eNB, an allocation rule for buffer data of a radio bearer which are to be allocated among eNBs, the allocation rule including information about an allocation proportion or including information about an allocation proportion and an applicable condition of the allocation proportion.

Preferably, the allocation rule is determined according to a load of the eNB (only one eNB sends the allocation rule, but multiple eNBs may be involved in the allocation proportion).

Preferably, the information about the allocation proportion includes at least one of the followings: the allocation proportion information is a proportion relationship of specific bearers among the eNBs; and the allocation proportion information is a proportion relationship of specific bearers belonging to LCGs among the eNBs, wherein the specific bearers are all or a part of DRBs or signalling radio bearers.

Preferably, the allocation proportion information is an allocation proportion for the sizes of buffer data in a PDCP layer among the eNBs, and the allocation rule further includes the size of buffer data of an RLC layer.

Step 702: the UE sends a BSR according to the allocation rule, the BSR being determined by the UE according to the allocation rule.

Preferably, the allocation proportion information and the applicable condition of the allocation proportion information are that: when the size of the buffer data is not larger than a predetermined value, the buffer data is sent from a specified eNB, or, is specified to be sent from an eNB where a large proportion of data of the radio bearer according to a predetermined allocation proportion is to be sent.

Figure 8:
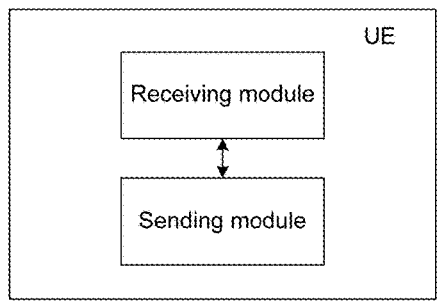
FIG. 8 is a diagram of the terminal according to an embodiment of the present disclosure.

In order to fulfil the aim of the method embodiment of the present disclosure, UE is further provided, which is described with reference to FIG. 8.

The UE includes a receiving module and a sending module, wherein the receiving module is configured to receive an allocation rule sent to the UE by an eNB, the allocation rule including proportion information or including proportion information and an applicable condition of the proportion information; and the sending module is configured to send a BSR from the UE to the eNB, the BSR being determined by the UE according to the allocation rule.

The allocation rule is determined according to a load of the eNB.

The allocation proportion information includes at least one of the followings: the allocation proportion information is a proportion relationship of specific bearers among the eNBs; and the allocation proportion information is a proportion relationship of specific bearers belonging to LCGs among the eNBs, wherein the specific bearers are DRBs or signalling radio bearers.

When the load of the eNB changes or signal quality of a cell corresponding to the eNB is reduced, the eNB resends the allocation rule.

The allocation proportion information is a proportion for values of buffer data in a PDCP layer, and the allocation rule further includes a value of a data buffer space of an RLC layer. The allocation proportion information and the applicable condition of the allocation proportion information are that: when the size of the buffer data is not larger than a predetermined value, the buffer data is sent from a specified eNB, or, is specified to be sent from an eNB where a large proportion of data of the radio bearer according to a predetermined allocation proportion is to be sent.

The embodiment of the present disclosure further provides a computer storage medium, in which computer-executable instructions are stored, the computer-executable instructions being configured to execute the methods of the embodiments of the present disclosure.

The abovementioned embodiments will be specifically described in the following application examples in a manner of combining an eNB and UE.

Application Example 1

Figure 9:
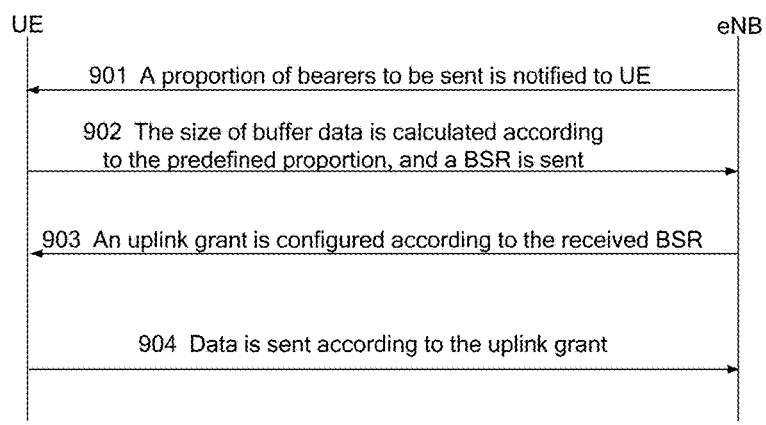
FIG. 9 is a flowchart of application embodiment 1 of the present disclosure.

Descriptions are made with reference to FIG. 9.

UE establishes a connection with cell 1, eNB 1 adds cell 3 to the UE according to a measurement report due to increase of traffic, and there are two DRBs, i.e. DRB 1 and DRB 2 respectively, belonging to LCG0 at present.

Step 901: eNB 1 notifies the UE that data of DRB 1 and data of DRB 2 are both sent on eNB 1 and eNB 2 according to a proportion of 3:7 according to signal quality of cell 1 and cell 3 and information such as loads of eNB 1 and eNB 2, that is, allocation proportion information is a proportion relationship of specific bearers between eNBs. In the embodiment, the specific bearers are DRB 1 and DRB 2, and the eNBs refer to eNB 1 and eNB 2.

Step 902: when needing to send uplink data, the UE calculates the size of buffer data of LCG0 of each eNB to send a BSR according to a predefined proportion, wherein there are two DRBs on LCG0, so that calculation may be performed together:

eNB1: the size of buffer data of the two DRBs in an RLC layer is 200+300, the size of buffer data of the two DRBs in a PDCP layer is 600, and eNB 1 is required to send 30% of data, i.e. 600×30%, of the two DRBs according to the predefined proportion, so that the size of buffer data in a BSR is 500+180=680. The UE sends to eNB 1 a BSR containing 680 buffer data of LCG0. LCGs 1, 2 and 3 have no DRBs, so that sizes of buffer data thereof are 0.

eNB 2: the size of buffer data of the two DRBs in an RLC layer is 300+400, the size of buffer data of the two DRBs in a PDCP layer is 600, and eNB 2 is required to send 70% of data, i.e. 600×70%, of the two DRBs according to the predefined proportion, so that the size of buffer data in a BSR is 700+420=1,120. The UE sends to eNB 2 a BSR containing 1,120 buffer data of LCG0. LCGs 1, 2 and 3 have no DRBs, so that sizes of buffer data thereof are 0.

Step 903: eNB 1 receives the BSR from the UE, and configures an uplink grant according to the size of the buffer data; and eNB 2 receives the BSR reported by the UE, and configures an uplink grant according to the size of the buffer data.

Step 904: the UE receives the uplink grants, and sends the uplink data.

Descriptions are made with reference to FIG. 10.

Application Example 2

UE establishes a connection with cell 1, eNB 1 adds cell 3 to the UE according to a measurement report due to traffic increase, and there are two DRBs, i.e. DRB 1 and DRB 2 respectively, belonging to LCG0 at present.

Step 1001: eNB 1 notifies the UE that data of DRB 1 and data of DRB 2 are both sent on eNB 1 and eNB 2 according to a proportion of 3:7 according to signal quality of cell 1 and cell 3 and information such as loads of eNB 1 and eNB 2, that is, allocation proportion information is a proportion relationship of specific bearers between eNBs. The specific bearers are all DRBs (including DRB 1 and DRB 2), and the eNBs refer to eNB 1 and eNB 2.

Step 1002: when needing to send uplink data, the UE calculates the size of buffer data of LCG0 of each eNB to send a BSR according to a predefined proportion, wherein there are two DRBs on LCG0, so that calculation may be performed together:

eNB 1: the size of buffer data of the two DRBs in an RLC layer is 200+300, the size of buffer data of the two DRBs in a PDCP layer is 600, and eNB 1 is required to send 30% of data, i.e. 600×30%, of the two DRBs according to the predefined proportion, so that the size of buffer data in the BSR is 500+180=680. The UE reports the BSR containing the size of 680 of the buffer data of LCG0 to eNB 1. LCGs 1, 2 and 3 have no DRBs, so that sizes of buffer data thereof are 0.

eNB 2: the size of buffer data of the two DRBs in an RLC layer is 300+400, the size of buffer data of the two DRBs in a PDCP layer is 600, and eNB 2 is required to send 70% of data, i.e. 600×70%, of the two DRBs according to the predefined proportion, so that the size of buffer data in a BSR is 700+420=1,120. The UE sends the BSR containing the size of 1,120 of the buffer data of LCG0 to eNB 2. LCGs 1, 2 and 3 have no DRBs, so that sizes of buffer data thereof are 0.

Step 1003: eNB 1 receives the BSR from the UE, and configures an uplink grant according to the size of the buffer data; and eNB 2 receives the BSR from the UE, and configures an uplink grant according to the size of the buffer data.

Step 1004: the UE receives the uplink grants, and sends the uplink data.

Step 1005: a load of eNB 1 is increased at a certain moment, the eNB determines to modify the proportion of data bearers to be sent, and notifies the UE that data of DRB 1 and data of DRB 2 are both sent on eNB 1 and eNB according to a proportion of 2:8;

or due to increase of a load of eNB 2, the eNB modifies the proportion of data bearers to be sent, and notifies the UE that data of DRB 1 and data of DRB 2 are both sent on eNB 1 and eNB 2 according to a proportion of 4:6, wherein the same subsequent process and a similar calculation method are executed, and will not be described.

Step 1006: when sending the uplink data, the UE calculates the size of the buffer data of LCG0 of each eNB to send the BSR according to a new configured proportion, wherein there are two DRBs, so that calculation may be performed together:

eNB 1: the size of the buffer data of the two DRBs in the RLC layer is 200+300, the size of the buffer data of the two DRBs in the PDCP layer is 600, and eNB 1 is required to send 20% of the data, i.e. 600×20%, of the two DRBs according to the predefined proportion, so that the size of the buffer data in the BSR is 500+120=620. The UE sends the BSR containing the size of 620 of the buffer data of LCG0 to eNB 1. LCGs 1, 2 and 3 have no DRBs, so that sizes of buffer data thereof are 0.

eNB 2: the size of the buffer data of the two DRBs in the RLC layer is 300+400, the size of the buffer data of the two DRBs in the PDCP layer is 600, and eNB 2 is required to send 80% of data, i.e. 600×80%, of the two DRBs according to the predefined proportion, so that the size of the buffer data in the BSR is 700+480=1,180. The UE sends the BSR containing the size of 1,180 of the buffer data of LCG0 to eNB 2. LCGs 1, 2 and 3 have no DRBs, so that sizes of buffer data thereof are 0.

Step 1007: eNB 1 receives the BSR from the UE, and configures an uplink grant according to the size of the buffer data; and eNB 2 receives the BSR from the UE, and configures an uplink grant according to the size of the buffer data.

Step 1008: the UE receives the uplink grants, and sends the uplink data.

In Step 1002, the eNBs may further make such a limit that a DRB having smaller than or equal to 200 buffer data is specified to be sent from eNB 2 or is specified from the eNB where a large proportion of data of the radio bearer according to a predetermined allocation proportion is to be sent, and the UE calculates the size of the buffer data of LCG0 of each eNB to send the BSR according to the configured proportion. There are two DRBs on LCG0, so that calculation may be performed together:

eNB 1: the size of the buffer data of the two DRBs in the RLC layer is 200+300, the size of the buffer data of DRB 1 in the PDCP layer is 200, eNB 1 is not required to send DRB 1 according to the predefined proportion, the size of the buffer data of DRB 2 in the PDCP layer is 400, and eNB 1 is required to send 20% of the data, i.e. 400×20%, of DRB 2 according to the predefined proportion, so that the size of the buffer data in the BSR is 500+80=580. The UE reports the BSR containing 580 buffer data of LCG0 to eNB 1. LCGs 1, 2 and 3 have no DRBs, so that sizes of buffer data thereof are 0.

eNB 2: the size of the buffer data of the two DRBs in the RLC layer is 300+400, the size of the buffer data of DRB 1 in the PDCP layer is 200, eNB 2 is required to send all the data of DRB 1 according to the predefined proportion, the size of the buffer data of DRB 2 in the PDCP layer is 400, and eNB 2 is required to send 80% of data, i.e. 400×80%, of DRB 2 according to the predefined proportion, so that the size of the buffer data in the BSR is 700+200+320=1,220. The UE sends the BSR containing the size of 1,220 of the buffer data of LCG0 to eNB 2. LCGs 1, 2 and 3 have no DRBs, so that sizes of buffer data thereof are 0.

Application Example 2

UE establishes a connection with cell 1, eNB 1 adds cell 3 to the UE according to a measurement report due to traffic increase, and there are two DRBs, i.e. DRB 1 and DRB 2 respectively, belonging to LCG0 at present.

Step 1: eNB 1 notifies the UE that data of DRB 1 is sent on eNB 1 and eNB 2 according to a proportion of 3:7 and data of DRB 2 is sent on eNB 1 and eNB 2 according to a proportion of 2:8 according to signal quality of cell 1 and cell 3 and information such as loads of eNB 1 and eNB 2, that is, allocation proportion information is a proportion relationship of specific bearers between eNBs. In the embodiment, the specific bearers are DRB 1 and DRB 2, and the eNBs refer to eNB 1 and eNB 2.

Step 2: when needing to send uplink data, the UE calculates the size of buffer data of LCG0 of each eNB to send a BSR according to a predefined proportion, wherein there are two DRBs on LCG0, so that calculation may be performed together:

eNB1: the size of buffer data of DRB 1 in an RLC layer is 200, the size of buffer data of DRB 1 in a PDCP layer is 200, and eNB 1 is required to send 30% of data, i.e. 200×30%, of DRB 1 according to the predefined proportion, so that the size of buffer data in a BSR is 200+60=260;

the size of buffer data of DRB 2 in the RLC layer is 300, the size of buffer data of DRB 2 in the PDCP layer is 400, and eNB 1 is required to send 20% of data, i.e. 400×20%, of DRB 2 according to the predefined proportion, so that the size of buffer data in a BSR is 300+80=380; and the UE reports the BSR containing the size of 260+380=640 of the buffer data of LCG0 to eNB 1. LCGs 1, 2 and 3 have no DRBs, so that sizes of buffer data thereof are 0.

eNB 2: the size of buffer data of DRB 1 in an RLC layer is 300, the size of buffer data of DRB 1 in a PDCP layer is 200, and eNB 2 is required to send 70% of data, i.e. 200×70%, of DRB 1 according to the predefined proportion, so that a size of buffer data in a BSR is 300+140=440;

the size of buffer data of DRB 2 in the RLC layer is 400, the size of buffer data of DRB 2 in the PDCP layer is 400, and eNB 2 is required to send 80% of data, i.e. 400×80%, of DRB 2 according to the predefined proportion, so that a size of buffer data in a BSR is 400+320=720; and the UE sends the BSR containing the size of 440+720=1,160 of the buffer data of LCG0 to eNB 2. LCGs 1, 2 and 3 have no DRBs, so that sizes of buffer data thereof are 0.

Step 3: eNB 1 receives the BSR from the UE, and configures an uplink grant according to the size of the buffer data; and eNB 2 receives the BSR from the UE, and configures an uplink grant according to the size of the buffer data.

Step 4: the UE receives the uplink grants, and sends the uplink data.

Step 5: a load of eNB 1 is increased at a certain moment, the eNB determines to modify the proportion of data bearers to be sent, and notifies the UE that data of DRB 1 is sent on eNB 1 and eNB 2 according to a proportion of 1:9 and the sending proportion of DRB 2 is kept unchanged.

Step 6: when sending the uplink data, the UE calculates the size of the buffer data of LCG0 of each eNB to send the BSR according to the new configured proportion, wherein there are two DRBs, so that calculation may be performed together:

eNB 1: the size of the buffer data of DRB 1 in the RLC layer is 200, the size of the buffer data of DRB 1 in the PDCP layer is 200, and eNB 1 is required to send 10% of data, i.e. 200×10%, of DRB 1 according to the predefined proportion, so that the size of the buffer data in the BSR is 200+20=220;

the size of the buffer data of DRB 2 in the RLC layer is 300, the size of the buffer data of DRB 2 in the PDCP layer is 400, and eNB 1 is required to send 20% of the data, i.e. 400×20%, of DRB 2 according to the predefined proportion, so that the size of the buffer data in the BSR is 300+80=380; and the UE reports the BSR containing the size of 220+380=600 of the buffer data of LCG0 to eNB 1. LCGs 1, 2 and 3 have no DRBs, so that sizes of buffer data thereof are 0.

eNB 2: the size of the buffer data of DRB 1 in the RLC layer is 300, the size of the buffer data of DRB 1 in the PDCP layer is 200, and eNB 2 is required to send 90% of data, i.e. 200×90%, of DRB 1 according to the predefined proportion, so that the size of the buffer data in the BSR is 300+180=480;

the size of the buffer data of DRB 2 in the RLC layer is 400, the size of the buffer data of DRB 2 in the PDCP layer is 400, and eNB 2 is required to send 80% of data, i.e. 400×80%, of DRB 2 according to the predefined proportion, so that the size of the buffer data in the BSR is 400+320=720; and the UE sends the BSR containing the size of 480+720=1,200 of the buffer data of LCG0 to eNB 2. LCGs 1, 2 and 3 have no DRBs, so that sizes of buffer data thereof are 0.

Step 7: eNB 1 receives the BSR from the UE, and configures an uplink grant according to the size of the buffer data; and eNB 2 receives the BSR from the UE, and configures an uplink grant according to the size of the buffer data.

Step 8: the UE receives the uplink grants, and sends the uplink data.

Application Example 3

UE establishes a connection with cell 1, eNB 1 adds cell 3 to the UE according to a measurement report due to traffic increase, and there are two DRBs, i.e. DRB 1 belonging to LCG0 and DRB 2 belonging to LCG1 respectively, at present.

Step 1: the UE determines that the data of DRB on LCG0 is sent on eNB 1 and eNB 2 according to a proportion of 3:7 and the data of DRB on LCG1 is sent on eNB 1 and eNB 2 according to a proportion of 2:8 according to signal quality of cell 1 and cell 3 and information such as loads of eNB 1 and eNB 2, that is, allocation proportion information is a proportion relationship of specific bearers belonging to specific LCGs between eNBs. In the embodiment, the specific LCGs are LCG0 and LCG1, the specific bearers are DRB 1 and DRB 2, and the eNBs refer to eNB 1 and eNB 2.

Step 2: when needing to send uplink data, the UE calculates sizes of buffer data of LCG0 and LCG1 of each eNB to send BSRs according to the predefined proportions, wherein LCG0 has DRB 1 and LCG1 has DRB 2.

eNB1: the size of buffer data of DRB 1 in an RLC layer is 200, the size of buffer data of DRB 1 in a PDCP layer is 200, and eNB 1 is required to send 30% of data, i.e. 200×30%, of DRB 1 according to the predefined proportion, so that the size of buffer data in a BSR is 200+60=260;

the size of buffer data of DRB 2 in the RLC layer is 300, the size of buffer data of DRB 2 in the PDCP layer is 400, and eNB 1 is required to send 20% of data, i.e. 400×20%, of DRB 2 according to the predefined proportion, so that the size of buffer data in a BSR is 300+80=380; and the UE reports the BSR containing the size of 260 of the buffer data of LCG0 and the size of 380 of the buffer data of LCG1 to eNB 1. LCGs 2 and 3 have no DRBs, so that sizes of buffer data thereof are 0.

eNB 2: the size of buffer data of DRB 1 in an RLC layer is 300, the size of buffer data of DRB 1 in a PDCP layer is 200, and eNB 2 is required to send 70% of data, i.e. 200×70%, of DRB 1 according to the predefined proportion, so that the size of buffer data in a BSR is 300+140=440;

the size of buffer data of DRB 2 in the RLC layer is 400, the size of buffer data of DRB 2 in the PDCP layer is 400, and eNB 2 is required to send 80% of data, i.e. 400×80%, of DRB 2 according to the predefined proportion, so that the size of buffer data in a BSR is 400+320=720; and the UE sends the BSR containing the size of 440 of the buffer data of LCG0 and the size of 720 of the buffer data of LCG1 to eNB 2. LCGs 2 and 3 have no DRBs, so that sizes of buffer data thereof are 0.

Step 3: eNB 1 receives the BSR from the UE, and configures an uplink grant according to the size of the buffer data; and eNB 2 receives the BSR from the UE, and configures an uplink grant according to the size of the buffer data.

Step 4: the UE receives the uplink grants, and sends the uplink data.

Step 5: a load of eNB 1 is increased at a certain moment, the eNB notifies the UE that the load of eNB 1 is increased by 50% and it is necessary to modify the sending proportion, and the UE determines that the data of DRB on LCG0 is sent on eNB 1 and eNB 2 according to a proportion of 1:9 and the sending proportion of the DRB on LCG1 is kept unchanged after receiving the notice.

Step 6: when sending the uplink data, the UE calculates the size of the buffer data of LCG0 of each eNB to send the BSR according to a new proportion, wherein LCG0 has DRB 1 and LCG1 has DRB 2.

eNB 1: the size of the buffer data of DRB 1 in the RLC layer is 200, the size of the buffer data of DRB 1 in the PDCP layer is 200, and eNB 1 is required to send 10% of data, i.e. 200×10%, of DRB 1 according to the predefined proportion, so that the size of the buffer data in the BSR is 200+20=220;

the size of the buffer data of DRB 2 in the RLC layer is 300, the size of the buffer data of DRB 2 in the PDCP layer is 400, and eNB 1 is required to send 20% of the data, i.e. 400×20%, of DRB 2 according to the predefined proportion, so that the size of the buffer data in the BSR is 300+80=380; and the UE reports the BSR containing the size of 220 of the buffer data of LCG0 and the size of 380 of the buffer data of LCG1 to eNB 1. LCGs 2 and 3 have no DRBs, so that sizes of buffer data thereof are 0.

eNB 2: the size of the buffer data of DRB 1 in the RLC layer is 300, the size of the buffer data of DRB 1 in the PDCP layer is 200, and eNB 2 is required to send 90% of data, i.e. 200×90%, of DRB 1 according to the predefined proportion, so that the size of the buffer data in the BSR is 300+180=480;

the size of the buffer data of DRB 2 in the RLC layer is 400, the size of the buffer data of DRB 2 in the PDCP layer is 400, and eNB 2 is required to send 80% of data, i.e. 400×80%, of DRB 2 according to the predefined proportion, so that the size of the buffer data in the BSR is 400+320=720; and the UE sends the BSR containing the size of 480 of the buffer data of LCG0 and the size of 720 of the buffer data of LCG1 to eNB 2. LCGs 2 and 3 have no DRBs, so that sizes of buffer data thereof are 0.

Step 7: eNB 1 receives the BSR from the UE, and configures an uplink grant according to the size of the buffer data, and the UE receives the uplink grant, and sends the uplink data; and eNB 2 receives the BSR from the UE, and configures an uplink grant according to the size of the buffer data, and the UE receives the uplink grant, and sends the uplink data.

In Step 8, the UE discovers that the signal quality of cell 1 is reduced so as to determine to modify the sending proportion.

If the eNBs further configure DRBs on LCG2 and LCG3 for the UE, it is necessary to indicate sending proportions of the DRBs on the two LCGs on eNB 1 and eNB 2 to the UE respectively, and the UE performs calculation and reporting according to the indication.

In the abovementioned embodiment, if the UE is configured with cell 1, cell 3 and cell 4, cell 3 and cell 4 both belong to eNB 2, but there is no influence on a process and a calculation method for reporting the BSR to eNB 2 by the UE.

Particularly, when a sending proportion of a DRB on a certain eNB is 0, it is indicated that the DRB will not be sent through the eNB. The calculation sending method is still applicable.

Obviously, those skilled in the art should know that each module or step of the present disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, the shown or described steps may be executed in sequences different from the sequences here under some circumstances, or the modules or steps may form each integrated circuit module respectively, or multiple modules or steps therein can form a single integrated circuit module for implementation. As a consequence, the present disclosure is not limited to any specific hardware and software combination.

The above are the implementation modes disclosed by the present disclosure, but the described contents are only implementation modes adopted to facilitate understanding of the present disclosure and not intended to limit the present disclosure. Any modifications, equivalent replacements, improvements and the like made in implementation forms and details by those skilled in the art without departing from the spirit and scope of the present disclosure shall fall within the scope of protection of the present disclosure.

What is claimed is:

1. A method for sending a Buffer Status Report (BSR), comprising:

sending, by an Evolved Node B (eNB), to User Equipment (UE) an allocation rule for buffer data of a radio bearer which are to be allocated among eNBs, the allocation rule comprising information about an allocation proportion or comprising information about an allocation proportion and an applicable condition of the allocation proportion;

wherein the information about the allocation proportion comprises at least one of followings: the information about the allocation proportion is a proportion relationship of specific bearers among the eNBs; or the information about the allocation proportion is a proportion relationship of specific bearers belonging to Logical Channel Groups (LCGs) among the eNBs; the specific bearers are all or a part of Data Radio Bearers (DRBs) or signalling radio bearers;

wherein the information about the allocation proportion and the applicable condition of the allocation proportion are that: when a size of the buffer data is not larger than a predetermined value, the buffer data is sent from a specified eNB; or, the buffer data is sent from an eNB where a large proportion of data of the radio bearer according to a predetermined allocation proportion is to be sent; the predetermined allocation proportion comprises at least one of followings: a proportion relationship of specific bearers among the eNBs; or a proportion relationship of specific bearers belonging to Logical Channel Groups (LCGs) among the eNBs; the specific bearers are all or a part of Data Radio Bearers (DRBs) or signalling radio bearers; and receiving, by the eNB, a BSR from the UE, the BSR being determined by the UE according to the allocation rule.

2. The method for sending a BSR according to claim 1, wherein the allocation rule is determined according to a load of the eNB or signal quality of a cell corresponding to the eNB.

3. The method for sending a BSR according to claim 1, wherein, when a load of the eNB is changed or signal quality of a cell corresponding to the eNB is reduced, the eNB resends the allocation rule.

4. The method for sending a BSR according to claim 1, wherein the allocation proportion is an allocation proportion of buffer data in a Packet Data Convergence Protocol (PDCP) layer which are to be allocated among the eNBs.

5. An Evolved Node B (eNB), comprising:
a sending module, configured to send an allocation rule for buffer data of a radio bearer which are to be allocated among eNBs to User Equipment (UE), the allocation rule comprising information about an allocation proportion or comprising information about an allocation proportion and an applicable condition of the allocation proportion;
wherein the information about the allocation proportion comprises at least one of followings: the information about the allocation proportion is a proportion relationship of specific bearers among the eNBs, or the information about the allocation proportion is a proportion relationship of specific bearers belonging to Logical Channel Groups (LCGs) among the eNBs; the specific bearers are all or a part of Data Radio Bearers (DRBs) or signalling radio bearers;
wherein the information about the allocation proportion and the applicable condition of the allocation proportion are that: when a size of the buffer data is not larger than a predetermined value, the buffer data is sent from a specified eNB; or, the buffer data is sent from an eNB where a large proportion of data of the radio bearer according to a predetermined allocation proportion is to be sent; the predetermined allocation proportion comprises at least one of followings: a proportion relationship of specific bearers among the eNBs; or a proportion relationship of specific bearers belonging to Logical Channel Groups (LCGs) among the eNBs; the specific bearers are all or a part of Data Radio Bearers (DRBs) or signalling radio bearers;
and
a receiving module, configured to receive a Buffer Status Report (BSR) from the UE, the BSR being determined by the UE according to the allocation rule.

6. The eNB according to claim 5, wherein the allocation rule is determined according to a load of the eNB or signal quality of a cell corresponding to the eNB.

7. The eNB according to claim 5, wherein the allocation proportion is an allocation proportion of buffer data in a Packet Data Convergence Protocol (PDCP) layer which are to be allocated among the eNBs.

8. A method for sending a Buffer Status Report (BSR), comprising:
receiving, by User Equipment (UE), from an Evolved Node B (eNB) an allocation rule for buffer data of a radio bearer which are to be allocated among eNBs, the allocation rule comprising allocation proportion information or comprising allocation proportion information and an applicable condition of the allocation proportion information;
wherein the allocation proportion information comprises at least one of followings: the information about the allocation proportion is a proportion relationship of specific bearers among the eNBs; or the information about the allocation proportion is a proportion relationship of specific bearers belonging to Logical Channel Groups (LCGs) among the eNBs; the specific bearers are all or a part of Data Radio Bearers (DRBs) or signalling radio bearers;
wherein the allocation proportion information and the applicable condition of the allocation proportion information are that: when a size of the buffer data is not larger than a predetermined value, the buffer data is sent from a specified eNB; or, the buffer data is sent from an eNB where a large proportion of data of the radio bearer according to a predetermined allocation proportion is to be sent; the predetermined allocation proportion comprises at least one of followings: a proportion relationship of specific bearers among the eNBs; or a proportion relationship of specific bearers belonging to Logical Channel Groups (LCGs) among the eNBs; the specific bearers are all or a part of Data Radio Bearers (DRBs) or signalling radio bearers;
and
sending, by the UE, a BSR according to the allocation rule, the BSR being determined by the UE according to the allocation rule.

9. The method for sending a BSR according to claim 8, wherein the allocation rule is determined according to a load of the eNB or signal quality of a cell corresponding to the eNB.

10. The method for sending a BSR according to claim 8, wherein the allocation proportion is an allocation proportion of buffer data in a Packet Data Convergence Protocol (PDCP) layer which are to be allocated among the eNBs.

11. User Equipment (UE), comprising:
a receiving module, configured to receive from an Evolved Node B (eNB) an allocation rule for buffer data of a radio bearer which are to be allocated among eNBs, the allocation rule comprising allocation proportion information or comprising allocation proportion information and an applicable condition of the allocation proportion information;
wherein the allocation proportion information comprises at least one of followings: the information about the allocation proportion is a proportion relationship of specific bearers among the eNBs, or the information about the allocation proportion is a proportion relationship of specific bearers belonging to Logical Channel Groups (LCGs) among the eNBs; the specific bearers are all or a part of Data Radio Bearers (DRBs) or signalling radio bearers;
wherein the allocation proportion information and the applicable condition of the allocation proportion information are that: when a size of the buffer data is not larger than a predetermined value, the buffer data is sent from a specified eNB; or, the buffer data is sent from an eNB where a large proportion of data of the radio bearer according to a predetermined allocation proportion is to be sent; the predetermined allocation proportion comprises at least one of followings: a proportion relationship of specific bearers among the eNBs; or a proportion relationship of specific bearers belonging to Logical Channel Groups (LCGs) among the eNBs; the specific bearers are all or a part of Data Radio Bearers (DRBs) or signalling radio bearers;
and
a sending module, configured to send a Buffer Status Report (BSR) reported by the UE to the eNB, the BSR being determined by the UE according to the allocation rule.

12. The UE according to claim 11, wherein the allocation rule is determined according to a load of the eNB or signal quality of a cell corresponding to the eNB;

wherein when the load of the eNB is changed or the signal quality of the cell corresponding to the eNB is reduced, the eNB resends the allocation rule.

13. A non-transitory computer storage medium, in which computer-executable instructions are stored, the computer-executable instructions being configured to execute the method according to claim 1.

* * * * *